US009460194B2

(12) United States Patent
Olenick et al.

(10) Patent No.: US 9,460,194 B2
(45) Date of Patent: Oct. 4, 2016

(54) PERSISTING STATE AT SCALE ACROSS BROWSER SESSIONS

(71) Applicant: Microsoft Technology Licensing, LLC, Redmond, WA (US)

(72) Inventors: Brad Olenick, Redmond, WA (US); Federico Silva Armas, Seattle, WA (US); William Y. Moy, Bellevue, WA (US); Madhur Joshi, Kirkland, WA (US); Stephen Michael Danton, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 14/231,891

(22) Filed: Apr. 1, 2014

(65) Prior Publication Data
US 2015/0095854 A1     Apr. 2, 2015

Related U.S. Application Data

(60) Provisional application No. 61/905,128, filed on Nov. 15, 2013, provisional application No. 61/884,743, filed on Sep. 30, 2013, provisional application No. 61/905,111, filed on Nov. 15, 2013, provisional (Continued)

(51) Int. Cl.
*G06F 9/44*     (2006.01)
*G06F 17/30*    (2006.01)
(Continued)

(52) U.S. Cl.
CPC ....... *G06F 17/30654* (2013.01); *G06F 3/0481* (2013.01); *G06F 3/0482* (2013.01);
(Continued)

(58) Field of Classification Search
CPC .............. G06F 9/4443; G06F 9/4445; G06F 17/30654; G06F 17/218; G06F 17/30398; G06F 9/4856; G06F 3/0484; G06F 3/0481; G06F 3/0482; G06F 3/0485; G06F 3/04842; G06F 3/0488; G06F 3/04817; G06F 8/34
See application file for complete search history.

(56) References Cited

U.S. PATENT DOCUMENTS 5,886,694 A    3/1999  Breinberg et al.
6,750,887 B1   6/2004  Kellerman et al.
(Continued)

FOREIGN PATENT DOCUMENTS

EP          1615118         1/2006
WO      WO 02097601 A2    12/2002

OTHER PUBLICATIONS

"International Search Report and Written Opinion Received for PCT Patent Application No. PCT /US2014/057323", Mailed Date: Dec. 10, 2014, 8 Pages.

(Continued)

*Primary Examiner* — Aaron Lowenberger
(74) *Attorney, Agent, or Firm* — Ben Tabor; Doug Barker; Micky Minhas

(57) ABSTRACT

The management of application state storage associated with a hierarchical application. The hierarchical application includes multiple parent user interface elements, each of at least some having child user interface elements arranged in a corresponding hierarchy. The user may navigate through the hierarchical application. For instance, by selecting a child user interface element of a first parent user interface element having a first hierarchy of child user interface elements, the user might navigate to (and potentially also create) a second parent user interface element having a second hierarchy of child user interface elements. A hierarchical storage agent manages the state of the hierarchical application. The hierarchical storage agent provides application state to a remote storage over an application program interface in a manner that preserves at least some of the hierarchy of one or more parent user interface elements of the hierarchical application.

23 Claims, 6 Drawing Sheets

Related U.S. Application Data application No. 61/905,243, filed on Nov. 17, 2013, provisional application No. 61/905,114, filed on Nov. 15, 2013, provisional application No. 61/905,116, filed on Nov. 15, 2013, provisional application No. 61/905,129, filed on Nov. 15, 2013, provisional application No. 61/905,105, filed on Nov. 15, 2013, provisional application No. 61/905,247, filed on Nov. 17, 2013, provisional application No. 61/905,101, filed on Nov. 15, 2013, provisional application No. 61/905,119, filed on Nov. 15, 2013.

(51) Int. Cl.

| | |
|---|---|
| *G06F 3/0484* | (2013.01) |
| *G06F 17/21* | (2006.01) |
| *G06F 3/0481* | (2013.01) |
| *G06F 3/0482* | (2013.01) |
| *G06F 3/0485* | (2013.01) |
| *G06F 3/0488* | (2013.01) |
| *G06F 9/48* | (2006.01) |

(52) U.S. Cl.
CPC ........... *G06F3/0484* (2013.01); *G06F 3/0485* (2013.01); *G06F 3/0488* (2013.01); *G06F 3/04817* (2013.01); *G06F 3/04842* (2013.01); *G06F 8/34* (2013.01); *G06F 9/4443* (2013.01); *G06F 9/4445* (2013.01); *G06F 9/4856* (2013.01); *G06F 17/218* (2013.01); *G06F 17/30398* (2013.01)

(56) References Cited

U.S. PATENT DOCUMENTS

| | | | |
|---|---|---|---|
| 6,919,890 | B2 | 7/2005 | Halstead, Jr. |
| 6,944,829 | B2 | 9/2005 | Dando |
| 6,950,198 | B1 | 9/2005 | Berarducci et al. |
| 6,950,993 | B2 | 9/2005 | Breinberg |
| 7,062,475 | B1 | 6/2006 | Szabo et al. |
| 7,417,644 | B2 | 8/2008 | Cooper et al. |
| 7,577,938 | B2 | 8/2009 | Bent et al. |
| 7,669,140 | B2 | 2/2010 | Matthews et al. |
| 7,730,418 | B2 | 6/2010 | Wang et al. |
| 7,769,794 | B2 | 8/2010 | Moore et al. |
| 7,823,077 | B2 | 10/2010 | Kurtz et al. |
| 7,933,632 | B2 | 4/2011 | Flynt et al. |
| 7,954,064 | B2 | 5/2011 | Forstall et al. |
| 8,095,412 | B1 | 1/2012 | Zias et al. |
| 8,195,646 | B2 | 6/2012 | Evans et al. |
| 8,316,323 | B2 | 11/2012 | Saraiya et al. |
| 8,321,847 | B1 | 11/2012 | Garvin et al. |
| 8,453,065 | B2 | 5/2013 | Chaudhri et al. |
| 8,543,824 | B2 | 9/2013 | Louch et al. |
| 8,856,681 | B2 | 10/2014 | Rodden et al. |
| 8,869,027 | B2 | 10/2014 | Louch et al. |
| 9,195,477 | B1 * | 11/2015 | Spencer .................... G06F 8/38 |
| 9,244,661 | B1 | 1/2016 | Garvin et al. |
| 2002/0105658 | A1 | 8/2002 | Jackson et al. |
| 2003/0058286 | A1 * | 3/2003 | Dando .................. G06F 9/4443 715/853 |
| 2003/0090504 | A1 | 5/2003 | Brook et al. |
| 2003/0137540 | A1 * | 7/2003 | Klevenz ................ G06F 9/4443 715/762 |
| 2004/0098390 | A1 | 5/2004 | Bayliss et al. |
| 2004/0225581 | A1 | 11/2004 | Wyle et al. |
| 2004/0243576 | A1 | 12/2004 | Shrivastava et al. |
| 2005/0125727 | A1 * | 6/2005 | Ramachandran . G06F 17/30873 715/233 |
| 2005/0131889 | A1 | 6/2005 | Bennett et al. |
| 2005/0188349 | A1 | 8/2005 | Bent et al. |
| 2006/0053096 | A1 | 3/2006 | Subramanian et al. |
| 2006/0190833 | A1 | 8/2006 | SanGiovanni et al. |
| 2007/0136579 | A1 | 6/2007 | Levy et al. |
| 2007/0156740 | A1 | 7/2007 | Leland et al. |
| 2007/0162439 | A1 | 7/2007 | Petropoulos et al. |
| 2007/0209023 | A1 | 9/2007 | Nakagawa et al. |
| 2007/0233854 | A1 | 10/2007 | Bukovec et al. |
| 2007/0288667 | A1 | 12/2007 | Kamata et al. |
| 2008/0065974 | A1 | 3/2008 | Campbell |
| 2008/0109714 | A1 | 5/2008 | Kumar et al. |
| 2008/0144119 | A1 | 6/2008 | Otake |
| 2008/0320413 | A1 | 12/2008 | Oshiro et al. |
| 2009/0037605 | A1 | 2/2009 | Li |
| 2009/0106227 | A1 | 4/2009 | Davis |
| 2009/0254337 | A1 | 10/2009 | Sprecher et al. |
| 2009/0254822 | A1 | 10/2009 | Greenlee |
| 2009/0319939 | A1 | 12/2009 | Danton et al. |
| 2010/0115053 | A1 * | 5/2010 | Ryu ..................... G06F 9/4445 709/217 |
| 2010/0174774 | A1 * | 7/2010 | Kern ...................... H04L 29/06 709/203 |
| 2010/0262905 | A1 | 10/2010 | Li |
| 2011/0173537 | A1 | 7/2011 | Hemphill |
| 2012/0005581 | A1 | 1/2012 | Turner |
| 2012/0023442 | A1 | 1/2012 | Oshiro et al. |
| 2012/0030591 | A1 | 2/2012 | Demant et al. |
| 2012/0079379 | A1 | 3/2012 | Hathaway et al. |
| 2012/0167008 | A1 | 6/2012 | Zaman et al. |
| 2012/0206498 | A1 | 8/2012 | Kai et al. |
| 2012/0324422 | A1 | 12/2012 | Chartier et al. |
| 2012/0330668 | A1 | 12/2012 | Verna et al. |
| 2013/0139056 | A1 | 5/2013 | Borkowski et al. |
| 2013/0145314 | A1 | 6/2013 | Dhar et al. |
| 2013/0191880 | A1 | 7/2013 | Conlan et al. |
| 2013/0247006 | A1 | 9/2013 | Trowbridge |
| 2014/0298253 | A1 | 10/2014 | Jin et al. |
| 2014/0366157 | A1 | 12/2014 | Yancey et al. |
| 2015/0058709 | A1 | 2/2015 | Zaletel |
| 2015/0149937 | A1 | 5/2015 | Khalid et al. |

OTHER PUBLICATIONS

"International Search Report & Written Opinion Received for PCT Patent Application No. PCT/US2014/057940", Mailed Date: Jan. 12, 2015, 10 Pages.

"ACC97: How to Modify Query Properties in Microsoft Access", Available at least as early as Jan. 13, 2015, Available at <<http://support.microsoft.com/kb/304451>>.

Brydon, Michael, "Access Tutorial: Parameter Queries", Published Aug. 1997, Available at <<http:/fisher.osu.edu/~muhanna.1/837/MSAccess/tutorials/param.pdf>>.

International Search Report and Written opinion Issued in PCT Patent Application No. PCT/US2014/057322, Mailed Date: Jan. 22, 2015, 9 Pages.

International Search Report and Written Opinion Issued in PCT Application No. PCT/US2014/057938, Mailed Date: Feb. 6, 2015, 11 Pages.

International Search Report & Written Opinion for PCT Patent Application No. PCT/US2014/057321, Mailed Date: Feb. 6, 2015, 8 Pages.

International Search Report and Written Opinion Issued in PCT Application No. PCT/US2014/057324, Mailed Date: Jun. 24, 2015, 5 Pages.

Second Written Opinion Issued in PCT Application No. PCT/US2014/057939, Mailed Date: Jun. 24, 2015, 4 Pages.

W3c: "HTML5—A Vocabulary and Associated APIs for HTML and XHTML", Published Aug. 6, 2013, Available at <<http://www.w3.org/TR/2013/CR-html5-20130806/embedded-content-0.html#the-iframe-element>>.

"International Search Report and Written Opinion Received for PCT patent Application No. PCT/US2014/057939" Mailed Date Dec. 1, 2014, 8 pages.

"International Search Report and Written Opinion Received for PCT patent Application No. PCT/US2014/057324" Mailed Date Dec. 1, 2014, 8 pages.

"International Preliminary Report on Patentability Issued in PCT Application No. PCT/US2014/057938", Mailed Date: Sep. 17, 2015, 7 Pages.

(56) References Cited

OTHER PUBLICATIONS

"International Preliminary Report on Patentability Issued in PCT Application No. PCT/US2014/057321", Mailed Date: Dec. 4, 2015, 7 Pages.
"International Preliminary Report on Patentability Issued in PCT Application No. PCT/US2014/057939", Mailed Date: Dec. 4, 2015, 5 Pages.
Office Action dated Jan. 29, 2016 cited in U.S. Appl. No. 14/231,869.
Office Action dated Feb. 1, 2016 cited in U.S. Appl. No. 14/231,880.
Kumar, Dhananjay, "Live Tiles in XAML based Windows 8 Metro Application", Published on: Mar. 29, 2012, Available at: http://debugmode.net/2012/03/29/lives-tiles-in-xaml-based-windows-8-metro-application/.
Thurrott, Paul, "Windows 8 Feature Focus: Live Tiles", Published on: Jan. 28, 2013, Available at: http://winsupersite.com/article/windows8/windows-8-feature-focus-live-tiles-144652.
"International Preliminary Report on Patentability Issued in PCT Application No. PCT/US2014/057324", Mailed Date: Aug. 5, 2015, 6 pages.
Second Written Opinion Issued in PCT Patent Application No. PCT/US2014/057321, Mailed Date: Aug. 7, 2015, 6 Pages.
"W3C Technical Reports", Published Nov. 11, 1999, 8 Pages. Available at <<http://www.w3.org/Consortium/Process/Process-19991111.tr.html#RecsCR>>.
Second Written Opinion Issued in PCT Application No. PCT/US2014/057940, Mailed Date: Aug. 27, 2015, 8 Pages.
"International Preliminary Report on Patentability Issued in PCT Application No. PCT/US2014/057938", Mailed Date: Dec. 23, 2015, 8 Pages.
"International Preliminary Report on Patentability Issued in PCT Application No. PCT/USS2014/057323", Mailed Date: Dec. 23, 2015, 7 Pages.
"International Preliminary Report on Patentability Issued in PCT Application No. PCT/US2014/057940", Mailed Date: Dec. 23, 2015, 9 Pages.
Office Action dated Feb. 16, 2016 cited in U.S. Appl. No. 14/231,883.
"International Preliminary Report on Patentability Issued in PCT Patent Application No. PCT/US2014/057322", Mailed Date: Jan. 12, 2016, 6 Pages.
U.S. Appl. No. 14/231,883, May 24, 2016, Office Action.
U.S. Appl. No. 14/231,862, May 19, 2016, Office Action.
U.S. Appl. No. 14/231,846, Jun. 14, 2016, Office Action.
U.S. Appl. No. 14/231,897, Jun. 2, 2016, Office Action.
U.S. Appl. No. 14/231,905, Jun. 14, 2016, Office Action.
Office Action dated Aug. 17, 2016 cited in U.S. Appl. No. 14/231,869.

* cited by examiner

PERSISTING STATE AT SCALE ACROSS BROWSER SESSIONS

CROSS-REFERENCE TO RELATED APPLICATIONS

This application claims the benefit of each of the following provisional patent applications, and each of the following provisional patent applications are incorporated herein by reference in their entirety:
1. U.S. Provisional Application Ser. No. 61/905,105, filed Nov. 15, 2013;
2. U.S. Provisional Application Ser. No. 61/884,743, filed Sep. 30, 2013;
3. U.S. Provisional Application Ser. No. 61/905,111, filed Nov. 15, 2013;
4. U.S. Provisional Application Ser. No. 61/905,243, filed Nov. 17, 2013;
5. U.S. Provisional Application Ser. No. 61/905,114, filed Nov. 15, 2013;
6. U.S. Provisional Application Ser. No. 61/905,116, filed Nov. 15, 2013;
7. U.S. Provisional Application Ser. No. 61/905,129, filed Nov. 15, 2013;
8. U.S. Provisional Application Ser. No. 61/905,247, filed Nov. 17, 2013;
9. U.S. Provisional Application Ser. No. 61/905,101, filed Nov. 15, 2013;
10. U.S. Provisional Application Ser. No. 61/905,128, filed Nov. 15, 2013; and
11. U.S. Provisional Application Ser. No. 61/905,119, filed Nov. 15, 2013.

BACKGROUND

Often, users interact with an application up to a certain point, and thereafter restart the application. In web applications run in an internet browser, it is exceedingly easy to restart the application by running the browser's standard refresh command, or navigating to a different web site and back. Sometimes, some or all of the state of the application is not preserved prior to a restart. In computer applications that show significant user interface at the same time (such as multiple windows/pages, multiple user interface controls, and so forth), this could represent significant loss of state.

To preserve state, some applications allow the user to save in response to an explicit save command (e.g., by pressing the save button). Other applications allow the user to designate time intervals for automatic saving of the state. In either case, however, there is often some state that is not preserved through the restart. Some applications automatically save application state when the application is shut down, but not all shutdowns are orderly, and thus sometimes save at shutdown does not happen. Even if saves happen, the saves often occur in a local save only, and thus the restart cannot be from a different machine without losing state. Furthermore, if there is a loss in local storage performance, the locally saved state may not be useful anyway.

BRIEF SUMMARY

At least some embodiments described herein relate to the management of application state storage associated with a hierarchical application. The hierarchical application includes multiple parent user interface elements, each of at least some having child user interface elements arranged in a corresponding hierarchy. The user may navigate through the hierarchical application. For instance, by selecting a child user interface element of a first parent user interface element having a first hierarchy of child user interface elements, the user might navigate to (and potentially also create) a second parent user interface element having a second hierarchy of child user interface elements.

A hierarchical storage agent manages the state of the hierarchical application. The hierarchical storage agent provides application state to a remote storage over an application program interface in a manner that preserves at least some of the hierarchy of one or more parent user interface elements of the hierarchical application. The application program interface also allows the retrieval of hierarchically described portions of the remotely saved state. Accordingly, as navigation and edit operations occur in the hierarchical application, the corresponding navigation or edit state may be incrementally preserved. Since the amount of information passing through the API is much smaller due to the hierarchical structure of the storage, the providing of state (i.e., saving) may be performed much more frequently, perhaps in response to every navigation or edit event that changes application state.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
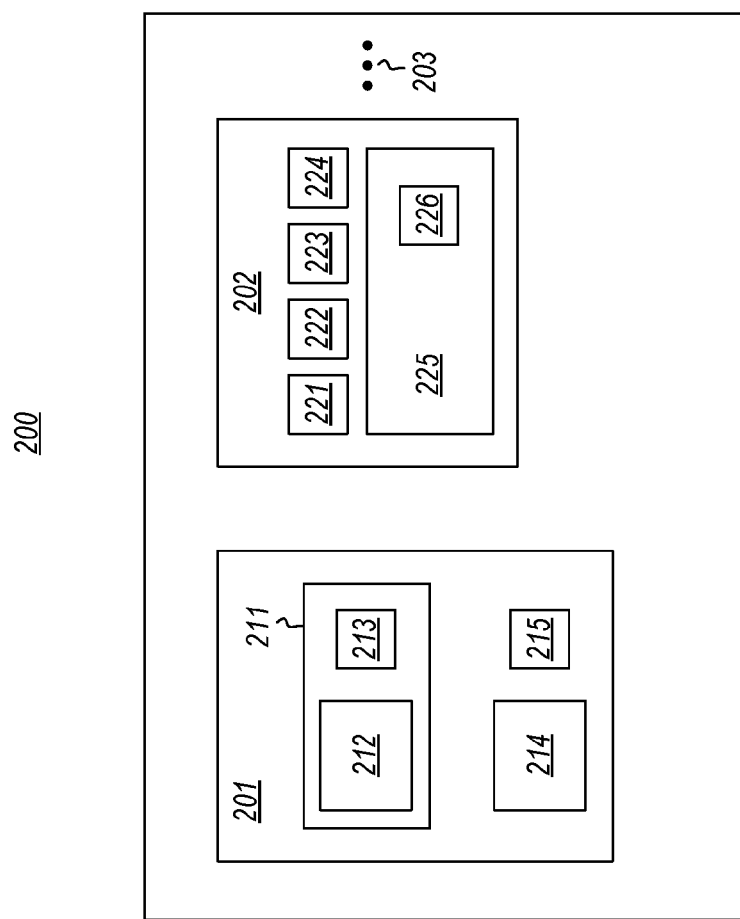
FIG. 1 abstractly illustrates an example computing system in which the principles described herein may be employed.

In computer applications that show significant user interface at the same time (e.g., multiple windows/pages, multiple user interface controls, and so forth), the user often hopes to restore the user interface state of the aggregate application user interface when the application is restarted. Importantly, in web applications run in an internet browser, it is exceedingly easy to "restart" the application by running the browser's standard "refresh" command, or navigating to a different web site and back.

The principles described herein involve augmenting an application in such a way that user interface state is implicitly and automatically saved as the user interacts with the application, and later restored so that the user interface state remains consistent when it is re-rendered. For instance, state would be restored when the application is restarted. It can also be restored as user interface controls are instantiated when windows/pages are restored on screen due to user interaction. Accordingly, the user experience has two distinct phases, one when the user is first interacting with the user interface to thereby affect user interface state, and one when the application is restarted and the user is hoping for the same user interface state.

In accordance with the principles described herein, a user interface program presents multiple parent user interface elements, each having a corresponding hierarchy of contained user interface elements. In the first phase of a user experience, when state is being generated and stored, the user may navigate, between the parent user interface elements. For instance, the user may select or otherwise interact with a child user interface element of one parent user interface element to generate another parent user interface element. The user may also edit user interface elements by entering or inputting data into the user interface elements, or reconfiguring one or more user interface elements.

A hierarchical storage agent tracks the navigation and editing activity of the user and provides corresponding state to a remote storage using an application program interface. The provided state includes a navigation sequence through which a user had navigated the multiple parent user interfaces. Furthermore, for each of some or all of the user interface elements, the provided state includes an edit state of the user interface element describing how the user populated the user interface elements with data that has yet to be saved.

The provided state is provided in a manner that preserves information regarding the corresponding hierarchy of the parent user interface elements in the remote storage. An application program interface is provided for this purpose, which also allows retrieval of the state for different granularities ranging from perhaps all of the state for the user interface, to perhaps state for just a single parent user interface element, to perhaps only hierarchically described portions of a specific user interface element.

In the second phase of the user experience, a user interface may retrieve the provided state to thereby repopulate all or portions of a user interface. For instance, this might be used in a simple restart scenario in which a browser refreshes, and the state is restored with all of the user's work preserved. This might be used in a sharing scenario in which the user allows another user to access the state to restore the first user's work and user interface experience to a second user. If this is done concurrently with the first user's work, this may also support a collaboration experience. The same user might also roam from one computer to another, and use the restored state to continue working where the user had left off. Thus, the user experience is enhanced, even in complex environments involving hierarchically structured user elements.

Some introductory discussion of a computing system will be described with respect to FIG. 1. Then, example user interfaces, methods and supporting architectures will be described with respect to subsequent figures.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

The computing system 100 also includes a display 112 on which a user interface, such as the user interfaces described herein, may be rendered. Such user interfaces may be generated in computer hardware or other computer-represented form prior to rendering. The presentation and/or rendering of such user interfaces may be performed by the computing system 100 by having the processing unit(s) 102 execute one or more computer-executable instructions that are embodied on one or more computer-readable media. Such computer-readable media may form all or a part of a computer program product.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
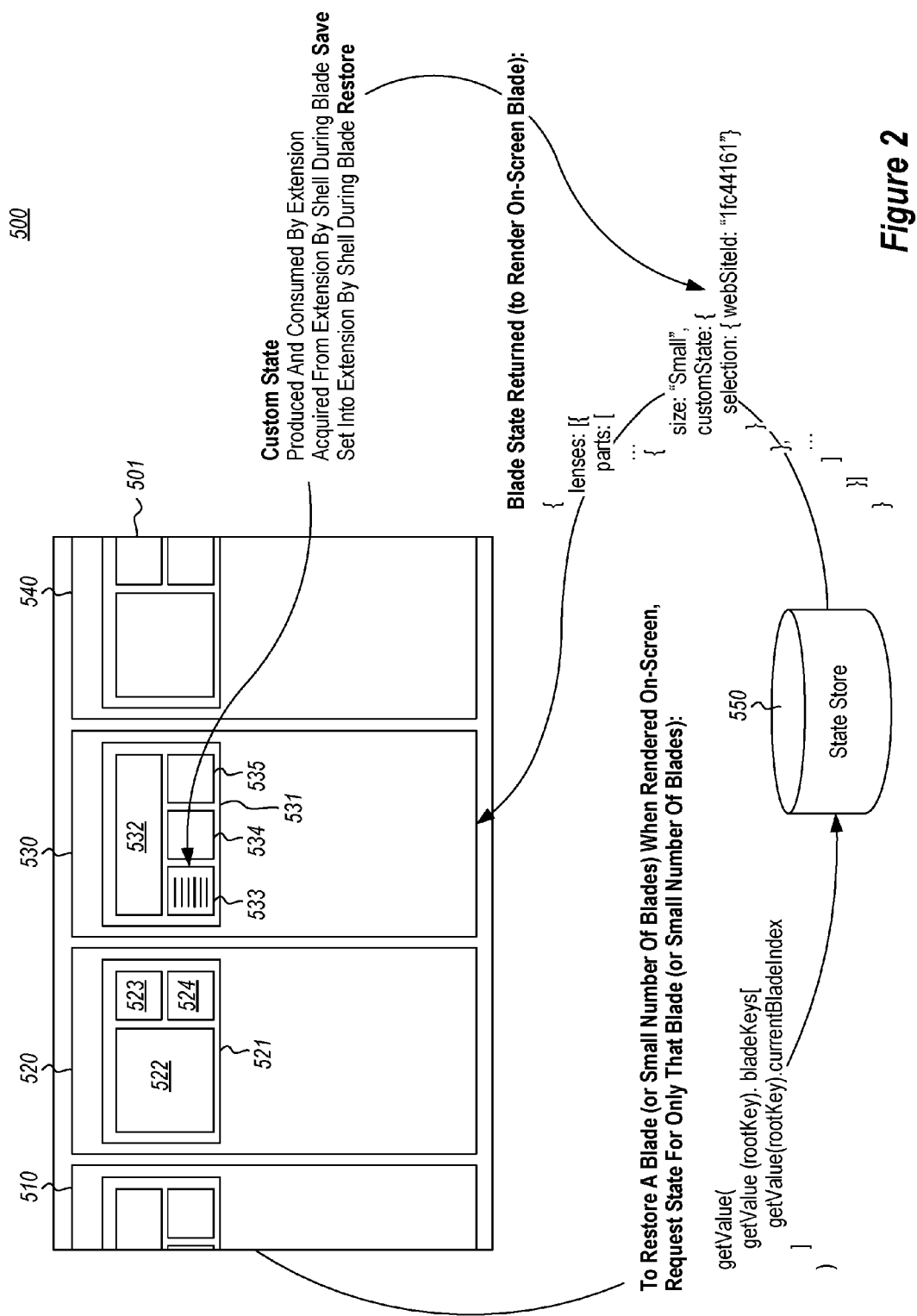
FIG. 2 abstractly illustrates a user interface that a user may be experiencing and interacting with, and includes multiple parent user interface elements, each having a corresponding hierarchy of child user interface element.

FIG. 2 illustrates a user interface 200 that a user may be experiencing and interacting with. The user interface 200 includes a first parent user interface element 201 that contains multiple child user interface elements 211 through 215 in accordance with a particular hierarchy suitable for the first parent user interface element 201. A second parent user interface element 202 also contains multiple child user interface elements 221 through 226 arranged in accordance with another particular hierarchy suitable for the second parent user interface element 202. The ellipses 203 represent that there may be further parent user interface elements in the user interface 200. The user may navigate through the user interface 200. For instance, in order to generate the second parent user interface element 202, the user might have selected one of the child user interface elements of the first parent user interface element 201.

Figure 3:
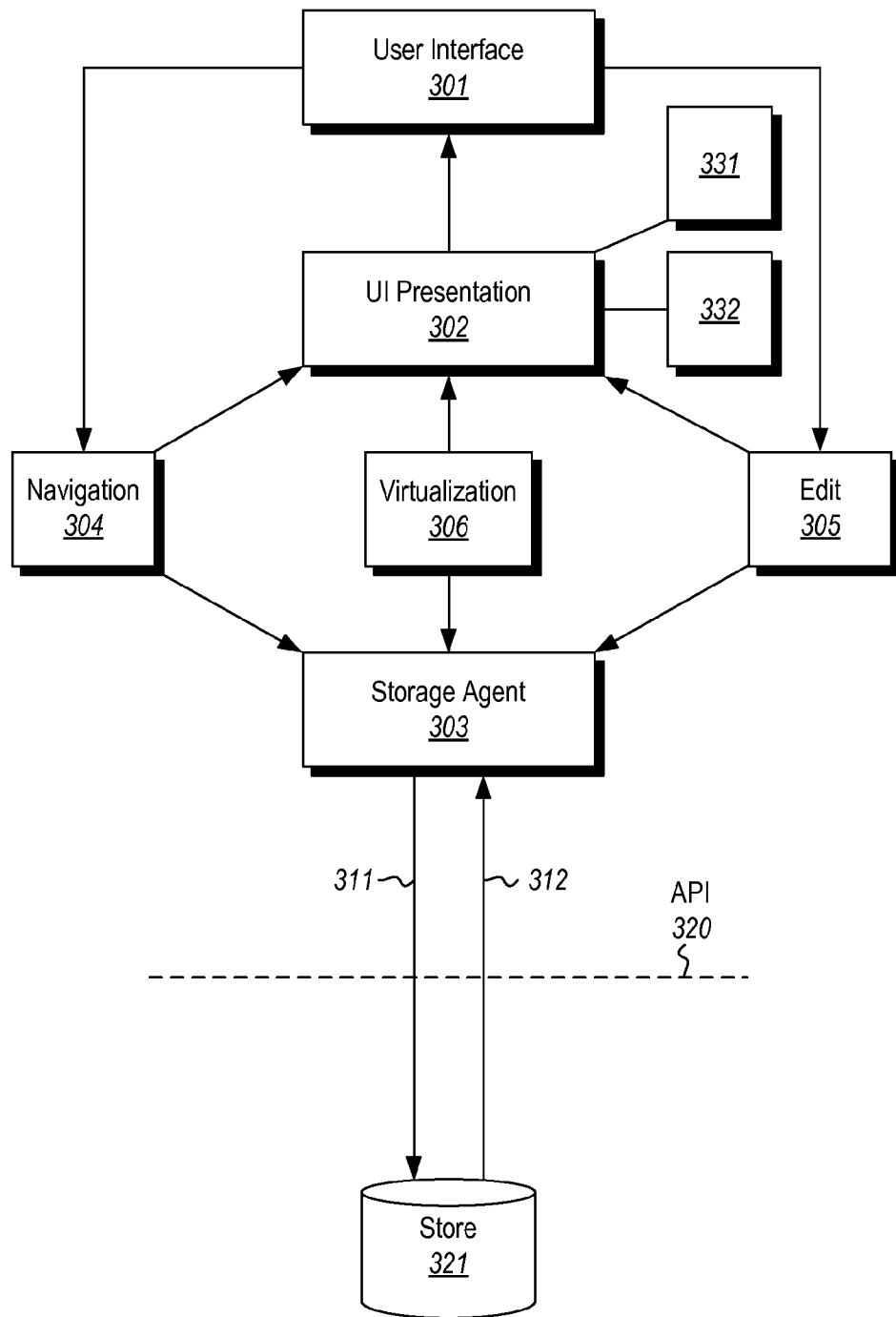
FIG. 3 illustrates a supporting architecture for a user interface presentation component, allowing a user interface showing a hierarchical application to hierarchically store and retrieve application state from a storage in a manner that preserves hierarchy.

FIG. 3 illustrates a supporting architecture 300 for a user interface component. A user interface presentation component 302 presents a user interface 301. For instance, the user interface 301 may represent the user interface 200 of FIG. 2. A hierarchical storage agent 303 provides state (as represented by arrow 311) to a remote storage 321 using an Application Program Interface (API) 320. The remote storage 321 might be, for example, cloud based storage, a storage within a storage area network, or any other remote storage.

The provided state includes navigation state representing how a user navigated through at least some of the user interface elements to arrive at a current state. The provided state also includes state of each of some or all of the user interface elements within the user interface 301.

For instance, in the case of FIG. 2, the provided state might include state from the parent user interface elements 201 and 202 and their child user elements, or a subset of those user interface elements. The state is provided through a flexible API 320. The API 320 and/or the manner in which the provided state is structured preserves information regarding the original hierarchy of the user interface elements from which the state came. That way, when the state is retrieved, the relevant state may be applied to the appropriate user interface elements.

In addition, the API 320 perhaps provides state to be saved and/or retrieves the state using different granularities. For instance, all of the state of the user interface 200 might be saved and/or retrieved in a single call or handshake. However, finer granularities might be saved and/or retrieved, such as perhaps at the granularity of a parent user interface element, the granularity of a child user interface element, or even perhaps at the granularity of a portion of the state of a user interface element. The API 320 would respond to the hierarchical data identification provided by the hierarchical storage agent 303 by retrieving the identified hierarchically structured data from, or providing such hierarchically structured data to, the remote store 321.

The hierarchical storage agent 303 updates the provided state upon further navigation by the user. For instance, a navigation component 304 detects user navigation through the user interface 301. The navigation component 304 notifies the user interface presentation component 302 so that the navigation may be reflected in the user interface 301, and also notifies the storage agent 303, so that the navigation state may be persisted in the store 321.

The hierarchical storage agent 303 also updates the provided state upon a change in at least some state of the user interface elements. For instance, an edit component 305 allows the user to edit user interface components within the user interface 301. The editing is detected by the edit component 305, and caused to project back to the user interface 301 via the user interface presentation component 302. Also, the editing causes the hierarchical storage agent to provide further state representing the editing to the remote storage. For instance, a user might edit data within a field, which in a broad context, is a state of the user interface element. On the other hand, the user might change the appearance or properties of the user interface element itself.

In any case, the editing component 305 might not cause all editing state to be persisted. For instance, if the user were to change the size or otherwise reconfigure or move a user interface element, these operations might be not be important to the user on a permanent basis. Accordingly, the user element might be marked to indicate which reconfiguring and/or editing operations are to be persisted.

The editing component 305 might also determine whether to make the corresponding edit only to the user interface element that was edited, or whether to make the corresponding edit to one or more related user interface elements also to which the edit may be applied. The editing component 305 may consider user instructions, as well as default settings in considering the scope of user interface elements to apply the change to, and cause the storage agent 303 to store the state as appropriate.

The user interface presentation component 302 may use a number of different types of user interface elements. Some of these user interface elements may be intrinsic user interface elements 331 provided by a system that can support as a platform for operation of multiple applications. Such intrinsic user interface elements might have general utility across multiple applications. Other user interface elements may be extrinsic user interface elements 332 provided by application developers, and which might have more specific utility to that application. The storage agent 303 provides state associated with navigation to and from any user interface elements, and editing of any user interface element, regardless of whether the user interface element is intrinsic or extrinsic. For instance, the provided state may be associated with extrinsic elements displayed in the user interface 301, as well as intrinsic elements from different applications also displayed in the user interface 301.

The system 300 also includes a virtualization component 306 that determines 1) when to remove state associated with a given user interface element of the multiple parent user interface element from the computing system (e.g., from the local memory or storage associated with the user interface 301), and 2) when to retrieve state associated with the given user interface element of the multiple parent user interface elements from the remote storage 321. The virtualization component 306 might determine to remove state for a given user interface element from local memory and/or storage when it is less likely that the given user interface element will appear on a display of the computing system based on user navigation behavior and options. The virtualization component 306 might determine to retrieve state when it is more likely that the given parent user interface element will appear on a display of the computing system based on user navigation behavior.

For instance, instead of the two parent user interface elements 201 and 202 shown side-by-side in FIG. 2, suppose that there were a hundred parent user interface elements side-by-side. Not all of the parent user interface elements are displayable at one time given the finite dimensions of a display. Accordingly, the virtualization component 306 might free up local memory and/or storage for parent user interface elements that are not within the display area, especially if it is not likely that the parent user interface elements will be displayed in the near future. As the user navigates through the hundred parent user interface elements, state for parent user interface elements may be released from local memory and/or storage and retrieved from remote storage as appropriate so that it appears that the state is ever present on the local machine.

The remote storage 321 can vary to enable interesting application experiences. The state can be stored per-user to allow for per-user customization of the application. The state can be stored in a "state service" available on the internet, enabling the user's application state to "roam" between computers. The state can be stored per-team to allow the application to show the same user interface arrangement to a group of application users. User interface state can be saved in a file and shared with others like one would share a word processing or spreadsheet document (created/saved by one user, and opened/modified by another, and so forth).

Figure 4:
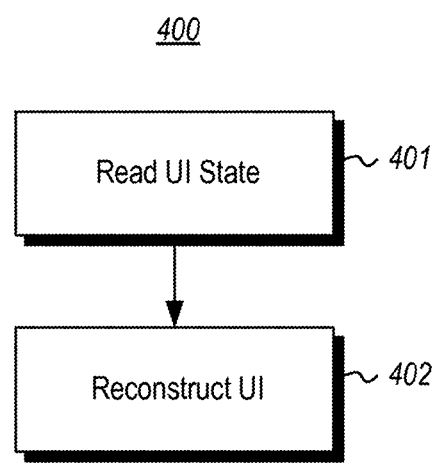
FIG. 4 illustrates a flowchart of a method for reconstructing all or a portion of a user interface previously interacted with by a user.

In the second phase of the user experience, an application retrieves state (as shown by arrow 312) from the store 321 in order to reconstruct all or portions of the user interface. FIG. 4 illustrates a flowchart of a method 400 for reconstructing all or a portion of a user interface previously interacted with by a user. The method 400 includes reading the user interface state that was previously provided to the store (act 401). The method 400 then includes using that read state to reformulate the user interfaces on a user interface in a state in which the user had previously navigated (act 402).

Various scenarios are enabled depending on the situation around reformulation of the user (which machine, which user, when reformulated). For instance, an application restart (e.g., a browser refresh) is enabled by reformulation of the user interface on the same display as was being used by the user when the state was originally formulated and the user interface displayed. Restart might occur at any time, whereas refresh usually implies that the reformulation is occurring as part of the same work session as the user interface was originally formulated in. A roaming scenario is enabled when the same user that formulated the user interface in the first place goes to a different display that is used to reformulate the user interface. A sharing scenario is enabled when a different user reformulates the user interface as compared to the original user that originally formulated the user interface. A collaboration scenario is enabled when the different users are formulating and reformulating in real-time.

A more specific user interface will now be described. In a more specific user interface, there is a canvas that extends in an extensible dimension (assumed horizontal in the remaining description, but may be vertical also). When a user selects a user interface element on the canvas, a new user interface element (called a "blade" herein) may appear and be added to the canvas in an extensible direction (assumed on the right in the remaining description, but the principles are not limited to adding blades to the right). Each blade is an example of a parent user interface element described above, and thus may contain multiple child user interface elements, which will be sometimes referred to herein as a "part". By selecting a part in an existing blade, a new blade may appear to the right of the canvas. Thus, by interacting with the canvas, a long sequence of blades may be formulated on the canvas, which may be an "infinite" canvas having no practical limit on the length of extensibility. The user may pan the canvas when the sequence of blades is too long to fit in a single display.

Figure 5:
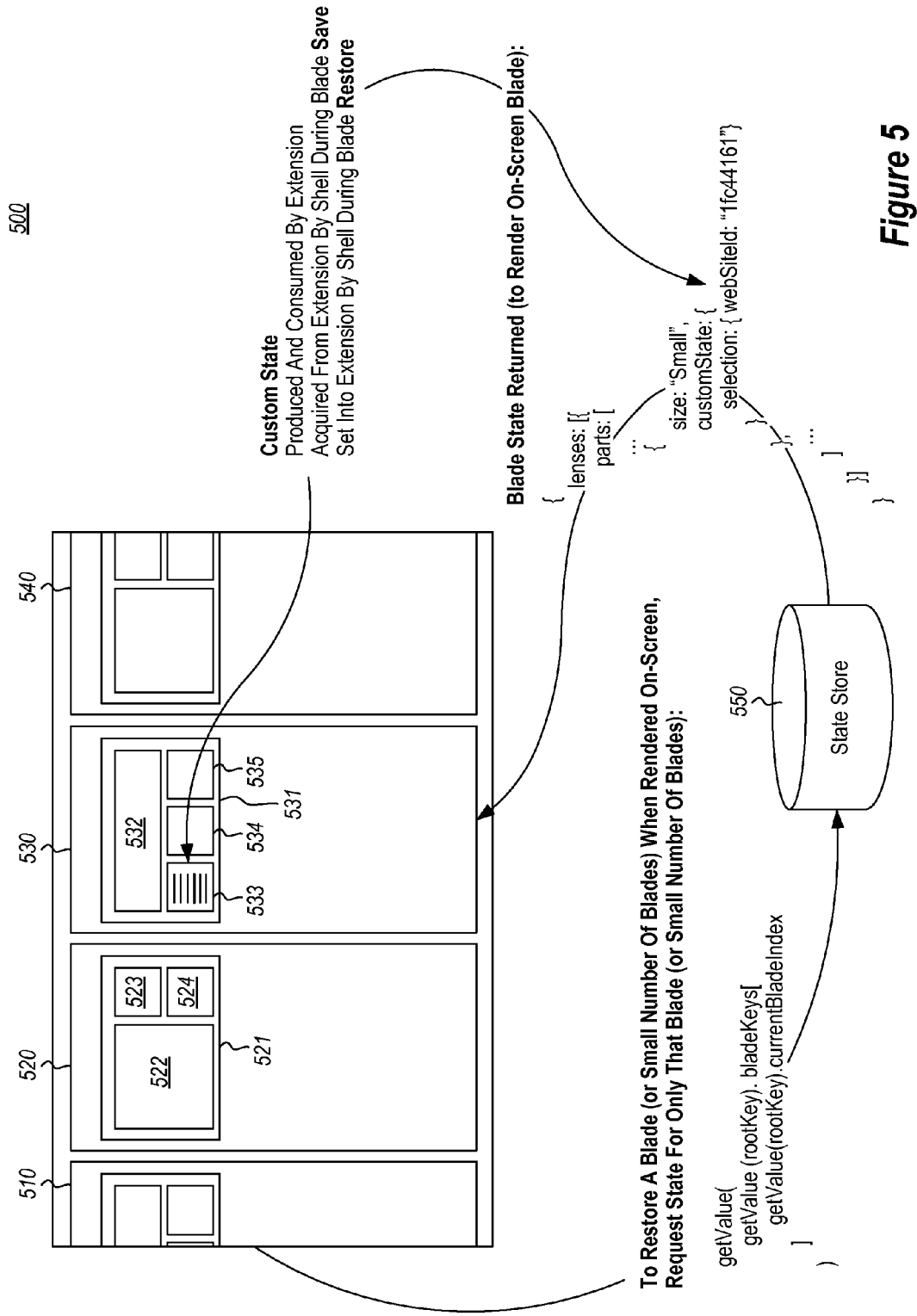
FIG. 5 illustrates an environment that includes a displayed portion of a user interface showing four blades, each having a hierarchy of parts.

For instance, FIG. 5 illustrates an environment 500 that includes a displayed portion 501 of a user interface. The displayed portion shows pieces of four different blades 510, 520, 530 and 540, though by scrolling or panning left or right, other blades in the sequences will be exposed to view. The blade 520 is illustrated as including parts 521 through 524. The blade 530 is illustrated as including parts 531 through 535. The other blades 510 and 540 also have parts that are not labeled. The blade 520 may have been created by selecting a part in a previous blade (such as blade 510). The blade 530 might have been created by selecting a part in a previous blade (e.g., part 521 of blade 520). The blade 540 might have been created by selecting a part in a previous blade (e.g., part 531 of blade 530, or perhaps part 522 of blade 520)

The parts contain a user interface that is generated by the provider of the system if the part is an intrinsic part, or by applications developers if the part is an extrinsic part. The applications are developed separately and loaded into the system. The system is largely unaware of the kind of user interface being generated into a given part by the application.

Thus, this is a composed application that shows lots of user interface on screen. With such a large user interface, the overall user experience is greatly benefited by preserving user interface state (such as user navigation, edits, and configuration) across shutdown and restart of the system. Likewise, as the canvas can contain many, many blades arranged side by side, the user interface state is maintained using virtualization to manage the local runtime resources in such a way that many blades do not degrade system performance due to excessive memory or processor use. The virtualization keeps the user interface state associated with visible blades active, while the user interface states for many or all of the off-screen blades are not retained locally.

In this particular embodiment, the "user interface state" refers to the type and relative position of each blade on the canvas, the number, arrangement and sizes of parts on each blade, as well as state contained in each part (e.g., the selection in a list part, the user-selected lines shown on a line chart part, the user-selected column names in a grid part, and so forth). The user experience of the application would be significantly degraded if any of this state were lost across shutdown/restart.

Referring again to FIG. 5, as the user customizes the user interface (adds blades to the canvas, removes blades, adds/removes parts from blades, repositions parts within or between blades, resizes parts, and so forth), this is captured by the application as serializable state. This state can be thought of as a large, tree-shaped data structure—the root of the tree being the list of blades and their state, each blade containing a list of lenses (another user interface container that may contain one or more parts), each lens containing its list of parts and their state. As the user proceeds to customize the user interface (open/close a blade, add/remove a part, and so forth), updates are made to the state tree. Accordingly, subtrees of this larger canvas state may be incrementally updated and the subtrees are saved to a state store.

The store 550 itself may be a conventional key/value structure. This design allows for the larger, logical state tree to be decomposed into small subtrees whose nodes are each stored under discrete keys. Since there is the potential for the user to create vast numbers of blades/parts—beyond what could be reasonably loaded into application memory and rendered as UI controls—this flattening allows for subsets of the larger state tree to be loaded and managed by the system at a given time. This is the basis for user interface virtualization. The application loads subsets of the state tree sufficient to render only those blades/parts that are on-screen (plus potentially some extra user interface that is slightly off-screen, to optimize for panning by the user). As the user pans the canvas and blades move off-screen, the state of the blade and its contained parts is saved and application resources (memory) for the blades/parts are freed. As blades are panned onto the screen, respective blade/part state is loaded from the state store and the state is configured into newly instantiated UI components/controls, effectively returning the UI to the state last seen by the user.

When the state tree is incrementally modified by the system in response to user customization/interaction (e.g., adding/removing a blade, adding/removing a part, interacting with a part to change its state (e.g., selecting a list item, choosing alternate columns in a grid view)), the application may save these changes incrementally. In that case, only discrete changes would be applied to the state store. There would be no wholesale rewrites of any significant part of the state tree.

In support of user interface virtualization, the key/value-shaped state store can be efficiently queried for batches of nodes in the logical state tree. Each query against the store describes those nodes whose values are to be returned to the application, sufficient to render one or more blades (and contained parts) on the screen. The query language uses nested queries in a novel way. In the simple example of FIG. 5, the most nested query returns the key for the "current" blade on the canvas, the enclosing query returns the value of the blade node under that key.

Since the state store 550 is a simple key/value store and the use of the store by the application is regular, many different application scenarios can be developed in terms of this state save/restore functionality. In the simplest case, state can be saved "per user" to reflect user customizations. In other cases, state can be saved in a store hosted in a service available on the internet (at an URL known to the application), making the application state roam with the user from computer to computer. State can be loaded from a store shared by multiple users in a group, so that each user can see the same shared application layout/configuration. The store itself can be developed as a file that can be distributed/shared with others, to allow for collaboration by people using this same application.

As mentioned earlier, the user interface state stored by the system here includes state of "parts" that are themselves developed as applications, developed separately from the system itself. Importantly, being developed separately, the system has no static awareness of any application. That being the case, to save the state contained within these parts, the system dynamically interacts with the part to extract its state each time the user interacts with the part, so that the system can include part state as an aspect of the state of its containing blade.

Figure 6:
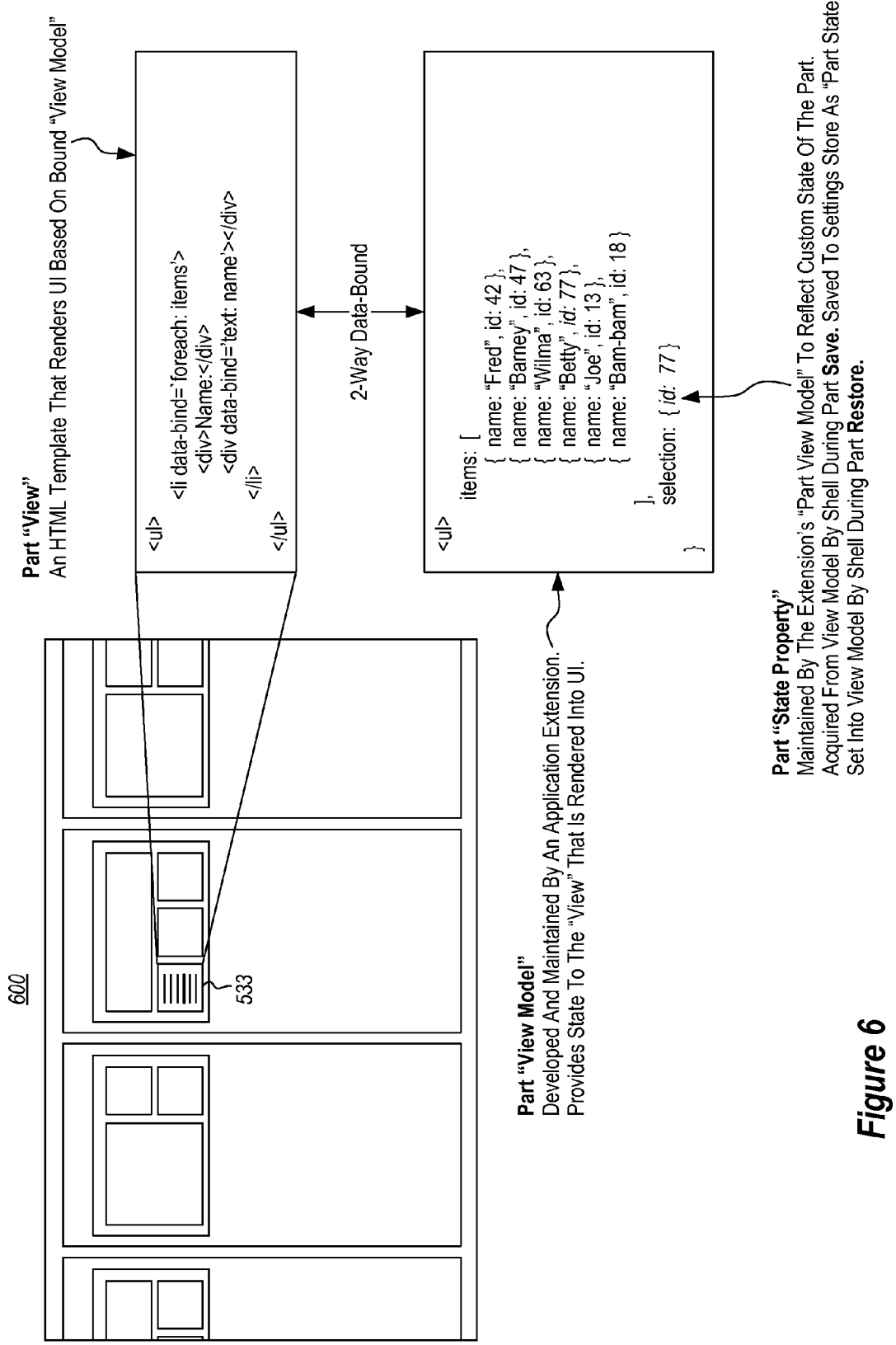
FIG. 6 illustrate an environment in which an application provides state via a view model to a user interface element.

In one embodiment of an environment 600, the part conveys state and changes to the state (reflecting user interaction) to the system using the following method referring to FIG. 6. First, these parts are designed to an MVVM (model/view/view model) pattern. For the system to generate user interface to be rendered within the visible boundaries of a part, that application shares with the system a view model, following the MVVM pattern. That is, the view model determines the values shown in the view (in the part), and changes to the view model are reflected as corresponding changes to the part's user interface. The application-provided view model not only drives the visual experience within a part, it also models the part's savable state. It is common that those view model properties driving visuals significantly overlap with those that should be saved/restored, so this leads to a natural application programming model for state save/restore. With this, user interactions with the part update the view and the view proceeds to reflect these changes in the view model. As the view model changes, for certain view model properties designated as "state properties" by the application authors, the system saves these part "state properties" to the settings store.

The part in question will ultimately be disposed of—either the system itself will be closed or a blade will be panned off-screen by the user. Once disposed, a given part can be reinstantiated (when the application is restarted, when a given blade is panned back on-screen). As part of initializing such a reinstantiated part, the system will load its state properties from the settings store, and before the part is rendered, set the state properties on a new instantiated view model.

Accordingly, embodiments described herein provide an effective mechanism for persisting navigation and/or edit state of an application across application restarts. Furthermore, in some embodiments, the state of user interface elements may be virtualized through active removal and retrieval of user interface state in response to navigation behavior.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising;
   a remote data store;
   one or more processors;
   one or more computer-readable storage media having thereon computer-executable instructions which, when executed by the one or more processors, cause the computing system to operate with an architecture that tracks a user's navigation among various interface elements having a hierarchal relationship to one another, and saves one or more states representing the user's navigation in order to permit the one or more states to be later restored; and
   wherein the architecture comprises:
      a user interface presentation component for presenting an interface having multiple interface elements comprised of both parent interface elements and child interface elements, with each parent interface element having a corresponding hierarchy of contained child interface elements;
      a navigation component that detects navigation through the multiple interface elements of the interface;
      an edit component that provides for editing of any of the multiple interface elements of the interface;
      a hierarchical storage agent that:
         (i) in response to notification of the navigation through the multiple interface elements detected by the navigation component, determines a state that is to be persisted for one or more navigations through the multiple interface elements, and wherein the determined state of the one or more navigations represents a corresponding part of the hierarchal relationship traversed during a given navigation; and
         (ii) in response to notification from the edit component of changes to one or more interface elements, updates any state that is to be persisted for a given navigation in which an interface element was edited; and
      an application program interface that receives each state that is to be persisted and communicates each received state to the remote data store, in order to enable any of the stored states to be recalled from the remote data store and then used in all of the following scenarios:
         (i) an application restart scenario using an interface on a display which is the same as the display used when first navigating the multiple interface elements and determining the stored state;
         (ii) a roaming scenario that permits a given user to recall at a second display device a state stored as a result of the given user's navigation of the multiple interface elements at a different display device; and
         (iii) a sharing scenario in which a given user's navigation resulting in one or more stored states permits recall of the given user's one or more stored states by a user other than the given user.

2. The computer system in accordance with claim 1, wherein at least one state that is to be persisted is based on a navigation that includes navigating both intrinsic interface elements and extrinsic interface elements.

3. The computer system in accordance with claim 1, wherein at least one state that is to be persisted is based on a navigation that includes navigating extrinsic interface elements from a first application, and extrinsic interface elements from a second application.

4. The computer system in accordance with claim 1, wherein in at least one state that is to be persisted is based on a navigation through multiple parent interface elements to arrive at the state to be persisted.

5. The computer system in accordance with claim 4, wherein the hierarchical storage agent updates a state to be persisted based on an edit change in one or more parent interface elements.

6. The computer system in accordance with claim 5, wherein one or more states to be persisted are based on a child interface element of a parent interface element, and wherein the child interface element is marked so as to cause the state for that child interface element to be saved in the remote data store based upon a certain change.

7. The computer system in accordance with claim 1, wherein the architecture further comprises:
   a virtualization component that determines 1) when to remove state associated with a given parent interface element, and 2) when to retrieve state associated with the given parent interface element from the remote data store.

8. The computer system in accordance with claim 7, wherein the determination of when to remove state occurs when it is less likely that the given parent interface element will appear on a display of the computing system based on user navigation behavior.

9. The computer system in accordance with claim 7, wherein the determination of when to retrieve state occurs when it is more likely that the given parent interface element will appear on a display of the computing system based on user navigation behavior.

10. The computer system in accordance with claim 1, wherein the editing component makes an edit to only a particular interface element being edited, and not other interface elements.

11. The computer system in accordance with claim 1, wherein the editing component makes an edit to a particular interface element and then also makes corresponding edits to a set of one or more interface elements hierarchically related to the particular interface element.

12. A computer-implemented method for tracking a user's navigation among various interface elements having a hierarchal relationship to one another, and saving one or more states representing the user's navigation in order to permit the one or more states to be later restored, the computer-implemented method being performed by one or more processors executing computer executable instructions for the computer-implemented method, and the computer-implemented method comprising:
  presenting at an interface multiple interface elements comprised of both parent interface elements and child interface elements, with each parent interface element having a corresponding hierarchy of contained child interface elements;
  tracking navigation through the multiple interface elements of the interface;
  editing any of the multiple interface elements of the interface;
  in response to the navigation tracked through the multiple interface elements, determining a state that is to be persisted for one or more navigations through the multiple interface elements, wherein the determined state of the one or more navigations represents a corresponding part of the hierarchal relationship traversed during a given navigation;
  in response to notification of edit changes to one or more interface elements, updating any state that is to be persisted for a given navigation in which an interface element was edited; and
  communicating each state that is to be persisted to a remote data store, in order to enable any of the stored states to be recalled from the remote data store and then used in all of the following scenarios:
    (i) an application restart scenario using an interface on a display which is the same as the display used when first navigating the multiple interface elements and determining the stored state;
    (ii) a roaming scenario that permits a given user to recall at a second display device a state stored as a result of the given user's navigation of the multiple interface elements at a different display device; and
    (iii) a sharing scenario in which a given user's navigation resulting in one or more stored states permits recall of the given user's one or more stored states by a user other than the given user.

13. The computer-implemented method in accordance with claim 12, wherein at least one state that is to be persisted is based on a navigation that includes navigating both intrinsic interface elements and extrinsic interface elements.

14. The computer-implemented method in accordance with claim 12, wherein at least one state that is to be persisted is based on a navigation that includes navigating extrinsic interface elements from a first application, and extrinsic interface elements from a second application.

15. The computer-implemented method in accordance with claim 12, wherein in at least one state that is to be persisted is based on a navigation through multiple parent interface elements to arrive at the state to be persisted.

16. The computer-implemented method in accordance with claim 15, wherein updating a state to be persisted is based on an edit change in one or more parent interface elements.

17. The computer-implemented method in accordance with claim 16, wherein one or more states to be persisted are based on a child interface element of a parent interface element, and wherein the child interface element is marked so as to cause the state for that child interface element to be saved in the remote data store based upon a certain change.

18. The computer-implemented method in accordance with claim 12, further comprising:
  determining 1) when to remove state associated with a given parent interface element, and 2) when to retrieve state associated with the given parent interface element from the remote storage.

19. The computer-implemented method in accordance with claim 18, wherein the determination of when to remove state occurs when it is less likely that the given parent interface element will appear on a display of the computing system based on user navigation behavior.

20. The computer-implemented method in accordance with claim 19, wherein the determination of when to retrieve state occurs when it is more likely that the given parent interface element will appear on a display of the computing system based on user navigation behavior.

21. The computer-implemented method in accordance with claim 12, wherein only a particular interface element is edited, and not other interface elements.

22. The computer-implemented method in accordance with claim 12, wherein an edit is made to a particular interface element and then corresponding edits are made to a set of one or more interface elements hierarchically related to the particular interface element.

23. A computer program product comprising one or more computer storage media storing computer executable instructions which, when executed by one or more processors, cause the one or more processors to perform a computer-implemented method for tracking a user's navigation among various interface elements having a hierarchal relationship to one another, and saving one or more states representing the user's navigation in order to permit the one or more states to be later restored, and wherein the computer-implemented method comprises:
  presenting at an interface multiple interface elements comprised of both parent interface elements and child interface elements, with each parent interface element having a corresponding hierarchy of contained child interface elements;
  tracking navigation through the multiple interface elements of the interface;
  editing any of the multiple interface elements of the interface;
  in response to the navigation tracked through the multiple interface elements, determining a state that is to be persisted for one or more navigations through the multiple interface elements, wherein the determined state of the one or more navigations represents a corresponding part of the hierarchal relationship traversed during a given navigation;
  in response to notification of edit changes to one or more interface elements, updating any state that is to be persisted for a given navigation in which an interface element was edited; and communicating each state that is to be persisted to a remote data store, in order to enable any of the stored states to be recalled from the remote data store and then used in all of the following scenarios:
  (i) an application restart scenario using an interface on a display which is the same as the display used when first navigating the multiple interface elements and determining the stored state;
  (ii) a roaming scenario that permits a given user to recall at a second display device a state stored as a result of the given user's navigation of the multiple interface elements at a different display device; and
  (iii) a sharing scenario in which a given user's navigation resulting in one or more stored states permits recall of the given user's one or more stored states by a user other than the given user.

* * * * *